United States Patent
Francois et al.

(10) Patent No.: US 11,583,045 B2
(45) Date of Patent: Feb. 21, 2023

(54) MATERIAL FOR TIMEPIECE AND JEWELLERY

(71) Applicant: The Swatch Group Research and Development Ltd, Marin (CH)

(72) Inventors: Nicolas Francois, Neuchatel (CH); Stephane Lauper, Cortaillod (CH); Gregory Kissling, Macolin (CH); Stewes Bourban, Chabrey (CH); Agnes Marlot Doerr, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 137 days.

(21) Appl. No.: 16/770,423

(22) PCT Filed: Nov. 29, 2018

(86) PCT No.: PCT/EP2018/083064
§ 371 (c)(1),
(2) Date: Jun. 5, 2020

(87) PCT Pub. No.: WO2019/115249
PCT Pub. Date: Jun. 20, 2019

(65) Prior Publication Data
US 2020/0383438 A1 Dec. 10, 2020

(30) Foreign Application Priority Data
Dec. 14, 2017 (EP) .................................... 17207445

(51) Int. Cl.
C08K 9/04 (2006.01)
A44C 27/00 (2006.01)
A44C 5/00 (2006.01)
B44F 1/02 (2006.01)

(52) U.S. Cl.
CPC .......... *A44C 27/001* (2013.01); *A44C 5/0053* (2013.01); *B44F 1/02* (2013.01); *C08K 9/04* (2013.01); *Y10T 428/252* (2015.01); *Y10T 428/2998* (2015.01)

(58) Field of Classification Search
CPC ....... A44C 27/001; A44C 5/0053; B44F 1/02; C08K 9/04; Y10T 428/252; Y10T 428/2998

USPC ......................................................... 523/212
See application file for complete search history.

(56) References Cited

U.S. PATENT DOCUMENTS

| | | | |
|---|---|---|---|
| 3,931,704 A | 1/1976 | Tominaga et al. | |
| 5,747,168 A | 5/1998 | Mack | |
| 2003/0035948 A1* | 2/2003 | Fujimaru | B32B 27/10 428/354 |
| 2014/0203468 A1 | 7/2014 | Humphries et al. | |
| 2014/0335325 A1 | 11/2014 | Humphries et al. | |
| 2017/0038734 A1 | 2/2017 | Issartel et al. | |

FOREIGN PATENT DOCUMENTS

| | | |
|---|---|---|
| CN | 103764379 A | 4/2014 |
| CN | 106462106 A | 2/2017 |
| DE | 42 34 020 A1 | 3/1994 |
| DE | 20 2012 103 376 U1 | 11/2012 |
| EP | 3 037 463 A1 | 6/2016 |
| GB | 2 330 835 A | 5/1999 |
| JP | 3-82012 U | 8/1991 |
| JP | 2004-49002 A | 2/2004 |
| WO | WO 02/49475 A1 | 6/2002 |
| WO | WO 2013/110128 A1 | 8/2013 |
| WO | WO 2015/150552 A1 | 10/2015 |

OTHER PUBLICATIONS

Final Office Action dated Dec. 14, 2021 in Japanese Patent Application No. 2020-528310 (with English translation), 5 pages.
Japanese Office Action dated Jul. 13, 2021 in Japanese Patent Application No. 2020-528310 (with English translation), 5 pages.
Combined Chinese Office Action and Search Report dated Aug. 4, 2021 in Chinese Patent Application No. 201880079929.4 (with English translation), 14 pages.
International Search Report dated Jan. 30, 2019 in PCT/EP2018/083064 filed Nov. 29, 2018, 3 pages.

\* cited by examiner

*Primary Examiner* — Hannah J Pak
(74) *Attorney, Agent, or Firm* — Oblon, McClelland, Maier & Neustadt, L.L.P.

(57) ABSTRACT

A piece, in particular for jewellery or timepieces, is made of a material comprising a synthetic matrix loaded with particles of a precious or semi-precious stone. The particles have a particle size d90 between 50 μm and 2 mm, preferably between 100 μm and 1 mm, and more preferably between 150 μm and 500 μm.

17 Claims, 1 Drawing Sheet

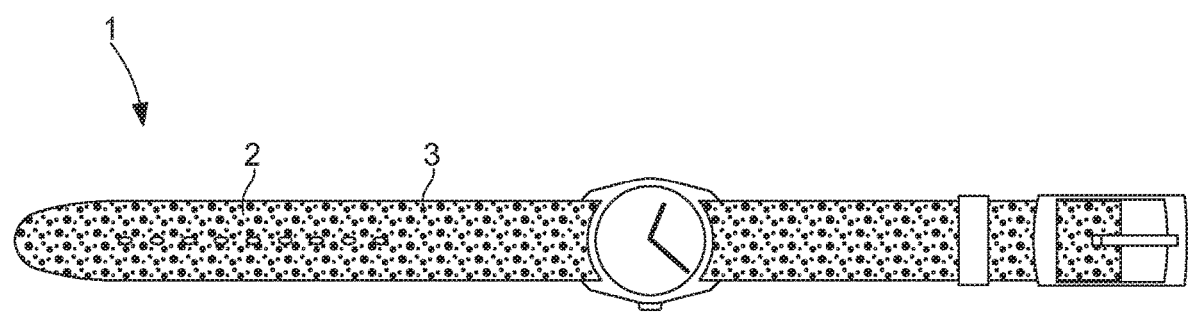

MATERIAL FOR TIMEPIECE AND JEWELLERY

OBJECT OF THE INVENTION

The present invention relates to a piece made of a material having a particular aesthetic effect thanks to the dispersion of powders of semi-precious or precious stones such as diamond within a synthetic matrix. It relates more particularly to a timepiece or a piece of jewellery made wholly or partly from this material.

Technological Background

Diamond is a commonly used material, whether for its properties or its aesthetic appearance. In a dispersed state, it is rather used to impart particular properties to a matrix. There are thus many works dealing with nano-diamonds distributed within a matrix to improve thermal conductivity or else resistance to wear. On the other hand, to impart an aesthetic appearance to a piece, diamond is used cut and set within the timepiece. To the knowledge of the applicant, the use of diamond powders dispersed within a matrix to improve the aesthetic appearance of the material has not been explored. The same applies for other semi-precious or precious stones such as ruby, etc.

SUMMARY OF THE INVENTION

The main object of the present invention is to propose a new aesthetically attractive material for the production of timepieces and pieces of jewellery.

To this end, the present invention provides a material comprising a matrix made of a synthetic material loaded with a powder of precious or semi-precious stones of micrometric size which gives the material its particular aesthetic appearance while giving it increased resistance (hardness and Young's modulus).

Advantageously, the particles, for example diamond particles, have a diameter d90 comprised between 50 µm and 2 mm, and, preferably between 100 µm and 1 mm and more preferably between 150 µm and 500 µm. Said particles being covered with a coupling agent having the function of strengthening and stabilising the bond between said particles and the synthetic material.

Thanks to the presence of a coupling agent around the particles the piece is reinforced and is more stable over time and the dispersion of the particles in the synthetic material is better controlled during manufacture.

The coupling agents must have reactive functions to chemically bond to the particles on the one hand and on the organic functions of the synthetic material and preferably, the coupling agent is a compound selected from the family of organosilanes, titanates or zirconates and the coupling agent represents between 0.1 and 5% by weight of the mixture of synthetic material and particles. Advantageously, the coupling agent is selected from 3-glycidyloxy epoxy propyltrimethoxysilane, pyrophosphatotitanate or isopropyl tri[di(octyl)phosphato] titanate or zirconium tetra-n-propanolate.

Advantageously, particularly for a diamond powder, the d90 is greater than or equal to 150 µm to enhance the sparkling effect of the diamond.

Depending on the hardness of the matrix, the field of application is different. Thus a flexible matrix is preferred for the manufacture of bracelets while a hard matrix is preferred for the manufacture of trim or movement pieces.

Depending on the type of stone, the size of the powder and its percentage within the matrix, the display can be modulated. Thus, a wide range of colours, a greater or lesser visibility of the particles constituting the powder, a more or less marked sparkling effect or depth effects depending on the level of transparency of the matrix can be obtained.

This new material further allows recycling production scrap from the cutting of diamonds or other precious or semi-precious stones used in particular in the field of watchmaking.

Other advantages will emerge from the features expressed in the claims, from the detailed description of the invention illustrated below using the appended drawing given by way of non-limiting example.

BRIEF DESCRIPTION OF THE FIGURES

FIG. 1 shows a schematic view of a watch provided with a bracelet made with the material according to the invention.

DETAILED DESCRIPTION OF THE INVENTION

The present invention relates to a timepiece and, in particular to a timepiece or jewellery, made of a composite material. Piece means both small elements intended to be affixed to a substrate such as a decorative element (logos, etc.) as well as a massive structural piece.

The material, illustrated in FIG. 1 for application in a bracelet 1, includes a synthetic matrix 2 loaded with a powder 3 of a precious stone such as diamond, ruby, sapphire and emerald or of a fine stone, also known as semi-precious stone, such as quartz, topaz, garnet, or else organic stone such as mother-of-pearl and amber to name a few. Precious or semi-precious stone means both a natural and a synthetic stone. By way of illustration, the examples will relate more specifically to a diamond powder.

According to the invention, the powders are micrometric. The powder particle size is measured by laser diffraction according to ISO 13320: 2009 and expressed below by the diameters d10 and d90 for which respectively 10 and 90% (by number) of the particles have a diameter less than or equal to the given diameter (cumulative distribution). Preferably, the powders have a granulometry d90 comprised between 50 µm and 2 mm, more preferably between 100 µm and 1 mm and, even more preferably, between 150 µm and 500 µm. Below a granulometry distribution with a d90 of 150 µm, the particles no longer have a sparkling appearance and are less identifiable as precious particles. However, with the finer granulometries, it is possible to disperse a larger amount of diamonds in the resin and therefore to obtain a material with a larger carat. These powders preferably have a fine granulometry distribution (better dispersibility) comprised between 1 µm and 100 µm, more preferably between 20 µm and 50 µm and, even more preferably, between 1 and 20 µm with a cumulative distribution d90 comprised between 5-15 µm and d10 comprised between 3 and 5 µm.

Diamonds can be of natural origin, which causes certain particles to fluoresce under ultraviolet radiation at 365 nm. The natural origin gives a shiny cream appearance to the powder. Diamonds can also be synthetic either monocrystalline which gives a shiny powder with a golden appearance or polycrystalline in which case the powder is shiny black.

Preferably, the matrix is produced from a transparent base resin in order to be able to visualize the particles within the matrix. Depending on the percentage of particles, this resin likely to become opaque. However, particles close to the surface of the material can still provide a certain shine, as long as its size is sufficient.

Depending on the piece to be produced, the matrix can be flexible or rigid.

A flexible matrix, i.e. having a shore A (ISO 7619-1: 2010) hardness less than or equal to 80, is selected for manufacturing flexible components such as a bracelet or the decoration of components by over-moulding for a "soft touch" appearance, such as a bezel or a crown. The matrix is a transparent elastomer matrix providing the elastic properties required for the application. Preferably, the choice of elastomer is based on a transparent fluorinated elastomer (FKM, FFKM) known for its great resistance to aging. The choice can however be made on other transparent elastomers such as heat-vulcanisable silicone (EVC), polyurethane elastomers (PUR) or thermoplastic elastomers (TPE).

The percentage of powder is adjusted to maintain the flexibility of the material. It is thus comprised between 0.5 and 40%, preferably between 0.5 and 30% and, more preferably, between 1 and 5% by weight relative to the total weight of the material. A loading rate less than or equal to 5% allows to preserve the transparency of the material without drastically modifying its mechanical properties. The transparency of the composite material being preserved, it is possible to achieve optical effects such as depth effects with the bottom material when the composite material is used as a decorative element. Moreover, maintaining the properties of the base material allows ensuring good use for moulding bracelets or decorating timepieces by over-moulding.

Tests were successfully carried out on a base resin FFKM from Solvay (grade 5910M). The diamond powder with a d90 of 50 µm was dispersed by mixing on an open mixer (calendering) in the elastomer. 2.5% by weight of mono and polycrystalline natural or synthetic diamond powders could be dispersed without modifying the features of the elastomer and its viscosity, with, ultimately, the desired sparkling effect on the product obtained.

Additional tests were carried out with an RTV (Room Temperature Vulcanisation) silicone loaded with 30% by weight for mono and polycrystalline natural or synthetic diamond powders, with a d90 of 60 µm. No cracks were observed on the elastomer. Ultimately, the product is opaque due to the high percentage of diamond powders. Nevertheless, it has an attractive rendering. Adding 30% by weight of diamond powder led to an increase of 10 shore A points of the material with nevertheless a value always below the value of 75 points, typically comprised between 60 and 70 shore A points desired for the comfort of the bracelet. It will be noted that such a high percentage tends to damage the rollers of the mixer due to the hardness of the diamond, which is industrially not desirable. In this case, it is preferable to disperse the micro-diamonds beforehand in a liquid solution of the heat-vulcanisable elastomer. FKM granules loaded with micro-diamonds are then obtained by evaporation of the solvent.

The flexible matrix as described above can be replaced by a rigid/hard matrix for the production of trim pieces such as a middle part, a bottom, a bezel, a push-piece, a bracelet link, a dial, a hand, a dial index, etc. or else movement pieces such as a bridge or a plate. Hard matrix means a matrix having a shore D hardness greater than or equal to 80 (ISO 868: 2003).

In the case of a rigid matrix, the increase in hardness following the addition of diamonds is less critical than for a flexible matrix. Therefore, the percentage of powder can be significantly higher with percentages which can rise above 50% by weight. Thus, the percentage by weight is comprised between 0.5 and 90%, preferably between 5 and 80%, and more preferably between 30 and 70%. The choice of percentage is made according to the level of transparency, the desired viscosity of the resin as well as the desired final result. The matrix is a transparent resin which can be, for example, a thermosetting resin selected from the family of acrylics, polyurethanes, epoxides or a copolymer resin combining monomers of the abovementioned families. The choice of resin may also be made on an acrylic thermoplastic resin such as PMMA or else be made on a polycarbonate (PC) thermoplastic resin. According to the invention, the diamond powder is pre-dispersed in the resin before adding the hardener. The hardener is added before the resin is poured into the mould. It is thus possible to produce inserts such as logos and decorations of all kinds, which are subsequently assembled on the trim pieces, for example by over-moulding, gluing, welding, riveting or screwing. It is also possible to directly mould the timepieces whose mechanical features will mainly depend on the selected resin and the diamond loading rate. It is also possible to inject the loaded resin by syringe deposition within a housing machined, for example into a push-piece, into a bezel or into a sapphire glass. After depositing within the housing, the resin is cured and the excess resin is removed by polishing. This inlay within a piece is facilitated by the good fluidity of the resin (<1000 mPa·s$^{-1}$), for example epoxy, the curing can be carried out at a low temperature of 80° C., typically.

Tests were carried out with a transparent thermosetting resin (refractive index of 1.5) two components of the epoxy-amine type with a shore hardness 90D. 60% by weight of micro-diamonds were dispersed in the epoxy resin with an epoxy silane (3-glycidyloxy epoxy propyltrimethoxysilane) from the brand Dynasylan Glyeo® as a coupling agent between the micro-diamonds and the epoxy resin. The tests were carried out with mono and polycrystalline natural and synthetic micro-diamonds with for each type of diamond a d90 of 100 and 500 µm tested. For natural diamonds, the product has a more or less shiny cream appearance depending on the particle size. For synthetic monocrystalline diamonds, the product also has a more or less shiny golden appearance depending on the particle size. For synthetic polycrystalline diamonds, the product has a black appearance. Additional tests have further been carried out with scrap from ruby stones of a timepiece of formula $Al_2O_3Cr$ crushed to obtain a d90 of 500 µm and dispersed in a transparent epoxy resin with a percentage of 60% by weight. A beautiful colour effect was observed with visible ruby particles in the matrix.

In summary, it can be seen that a wide range of effects (colours, shine, transparency, visibility of powder particles) can be obtained depending on the type of stone, its size and its percentage within the matrix. Finally, it will be specified that colouring, fluorescent and/or phosphorescent materials can be added to the (flexible or rigid) matrix to adapt the aesthetics of the piece if necessary.

It will also be noted that, in a variant, the matrix may be opaque and in this case stone particles having a size comprised between 100 and 500 µm will be preferred. Naturally the piece obtained by injection, moulding or other will be polished to reveal the particles of stones on the surface.

The invention claimed is:
1. A piece, comprising a material comprising a synthetic material matrix comprising particles of a precious or semi-precious stone,
   wherein the particles have a granulometry d90 of from 50 µm to 2 mm, and the particles are covered with a coupling agent that strengthens a bond between the particles and the synthetic material matrix, and wherein the coupling agent is at least one selected from the group consisting of 3-glycidyloxy epoxy propyltrimethoxysilane, pyrophosphatotitanate isopropyl tri[di(octyl)phosphato] titanate and zirconium tetra-n-propanolate.

2. The piece according to claim 1, wherein a content of the coupling agent is from 0.1 to 5% by weight, based on a total of the synthetic material matrix and the particles.

3. The piece according to claim 1, wherein the synthetic material matrix is a flexible matrix having a shore A hardness of 80 or less.

4. The piece according to claim 3, wherein the flexible matrix is a transparent elastomer resin selected form the group consisting of a fluorinated elastomer, heat-vulcanizable silicone, polyurethane elastomer and thermoplastic elastomer.

5. The piece according to claim 3, wherein a content of the particles is from 0.5 to 40% by weight based on the total weight of the material.

6. The piece according to claim 1, wherein the synthetic material matrix is a rigid matrix having a shore D hardness of at least 80.

7. The piece according to claim 6, wherein a content of the particles is from 0.5 to 90% by weight based on the total weight of the material.

8. The piece according to claim 6, wherein the rigid matrix is an acrylic or polycarbonate transparent thermoplastic resin, or a transparent thermosetting resin selected from the group consisting of acrylic, polyurethane, epoxide, and a copolymer thereof.

9. The piece according to claim 1, wherein the particles are particles of diamond, emerald, sapphire or ruby of natural or synthetic origin.

10. The piece according to claim 9, wherein the diamond is of natural origin and imparts a cream color to the material, or of synthetic and monocrystalline origin and imparts a golden color to the material or of synthetic and polycrystalline origin and imparts a black color to the material.

11. The piece according to claim 1, wherein the synthetic material matrix further comprises a coloring material, fluorescent material, phosphorescent material or a combination thereof.

12. The piece according to claim 1, which, in watchmaking, forms a movement piece or a trim piece.

13. The piece according to claim 12, wherein the movement piece or the trim piece comprises a part comprising the material, wherein the part is assembled on a surface of the movement or trim piece or is housed within a recess formed in the movement or trim piece.

14. The piece according to claim 13, wherein the part is a logo, a decoration or an element of the movement or trim piece.

15. The piece according to claim 12, wherein the synthetic material matrix is a rigid matrix, and the movement or trim piece is a timepiece selected from the group consisting of a bracelet link, a clasp, a middle part, a push-piece, a crown, a bezel, a crystal, a dial, a hand, a dial index, a bottom, a plate, a wheel and a bridge.

16. The piece according to claim 1, wherein the synthetic material matrix is a flexible matrix, and the piece is a bracelet.

17. A watch comprising a piece comprising a material comprising a synthetic material matrix comprising particles of a precious or semi-precious stone, wherein the particles have a granulometry d90 of from 50 µm to 2 mm, and the particles are covered with a coupling agent that strengthens a bond between the particles and the synthetic material matrix, and the coupling agent is at least one selected from the group consisting of 3-glycidyloxy epoxy propyltrimethoxysilane, pyrophosphatotitanate isopropyl tri[di(octyl)phosphato] titanate and zirconium tetra-n-propanolate.

* * * * *